United States Patent [19]
Gendreu et al.

[11] 3,775,766
[45] Nov. 27, 1973

[54] INDEPENDENT LANDING MONITORING PULSE RADAR SYSTEM

[75] Inventors: Robert Gendreu; Jean Genuist, both of Paris, France

[73] Assignee: Thomson-CSF, Paris, France

[22] Filed: Jan. 11, 1972

[30] Foreign Application Priority Data
Feb. 4, 1971   France ..........................7103732

[21] Appl. No.: 217,071

[52] U.S. Cl................................ 343/5 LS, 343/5 W
[51] Int. Cl............................................... G01s 9/00
[58] Field of Search................ 343/5 LS, 7 TA, 5 W

[56] References Cited
UNITED STATES PATENTS
| | | | |
|---|---|---|---|
| 2,426,218 | 8/1947 | Hopgood...................... | 343/5 LS X |
| 3,146,448 | 8/1964 | Shellet............................ | 343/112 R |
| 3,177,484 | 4/1965 | Case et al..................... | 343/5 LS X |
| 3,181,153 | 4/1965 | Cella............................. | 343/5 LS X |

*Primary Examiner*—T. H. Tubbesing
*Attorney*—John W. Malley et al.

[57] ABSTRACT

An Independent Landing Monitoring pulse radar system supplying angular information similar to these supplied by an I.L.S. system comprising circuits for improving the precision of the supplied data through compensation of the dynamic computation errors due to the aircraft displacement between successive data measurements, and circuits supplying additional position information such as location, velocity distance and estimated stopping distance. The system may also be operated for synthetic runway display, as a weather and as an anti-collision radar system.

8 Claims, 22 Drawing Figures

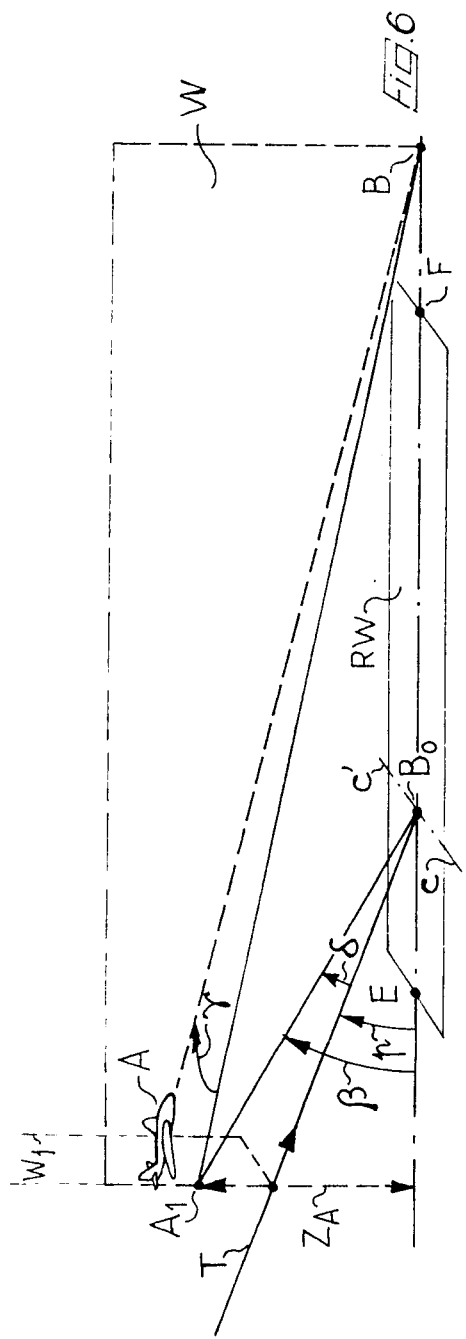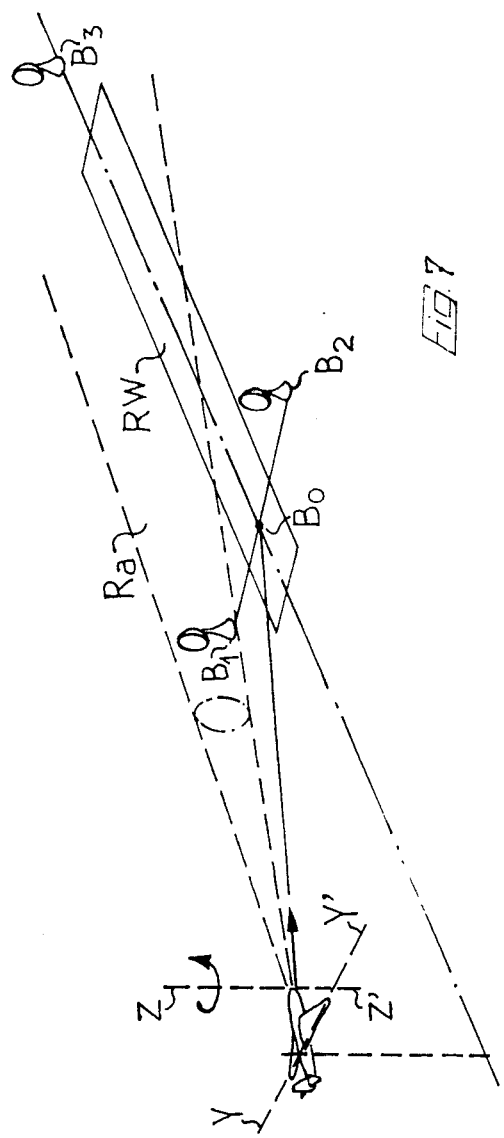
Fig. 6
Fig. 7

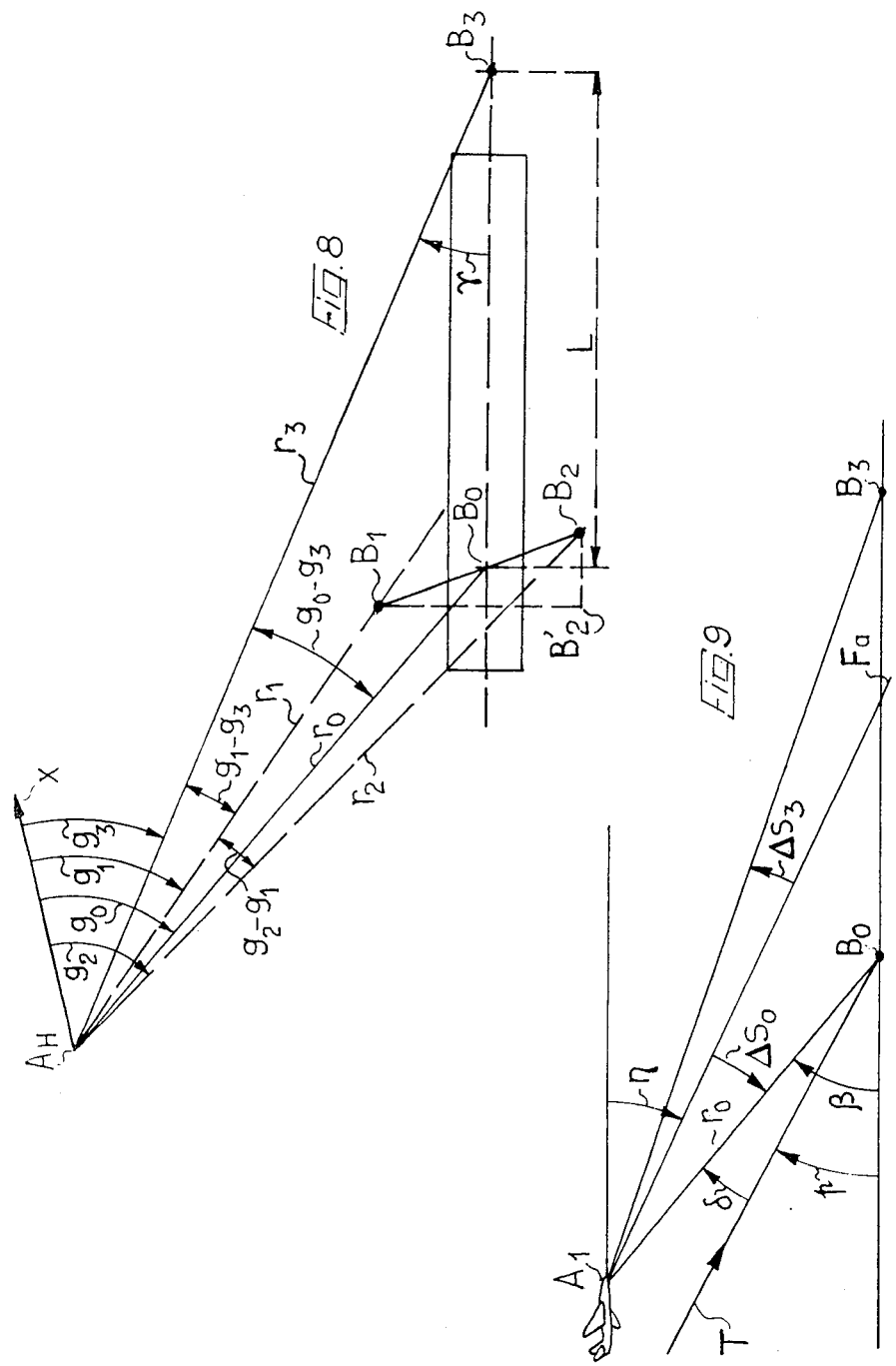

INDEPENDENT LANDING MONITORING PULSE RADAR SYSTEM

Independent Landing Monitoring systems or "ILM" are known which are combined with wheather and ground display radars.

The present invention relates to those, among such systems, which comprise pulse-modulated transmitter and associated receiver circuits combined with computing circuits, elaborating azimuthal and elevation angles, from the radar information and from known data related to the position of associated ground reflectors.

It is an object of this invention to improve ILM systems with the view of providing accurate angular information similar to those supplied by conventional ILS systems and in addition of providing the pilot with location, velocity, distance and estimated stopping distance information.

According to the invention there is provided an Independent Landing Monitoring pulse radar system for use in cooperation with three reflectors, and with an auxiliary on board system supplying flight parameters; said system supplying bearing and elevation information relative to the position of the aircraft with respect to the runway on which it has to land, similar to those supplied by conventional I.L.S. systems, said radar system further comprising: circuit means for compensating for the dynamic errors in the computation of said bearing information.

For a better understanding of the invention and to show how the same may be carried into effect, reference will be made to the attached figures in which:

FIG. 6 illustrates the angular parameters usually provided to the pilot of an aircraft for carrying out an automatic landing.

FIG. 7 illustrates an example of a system of reflectors cooperating with an ILM system according to the invention;

FIGS. 8 to 11 illustrate various input and output parameters of the system according to the invention;

Figure 12A:
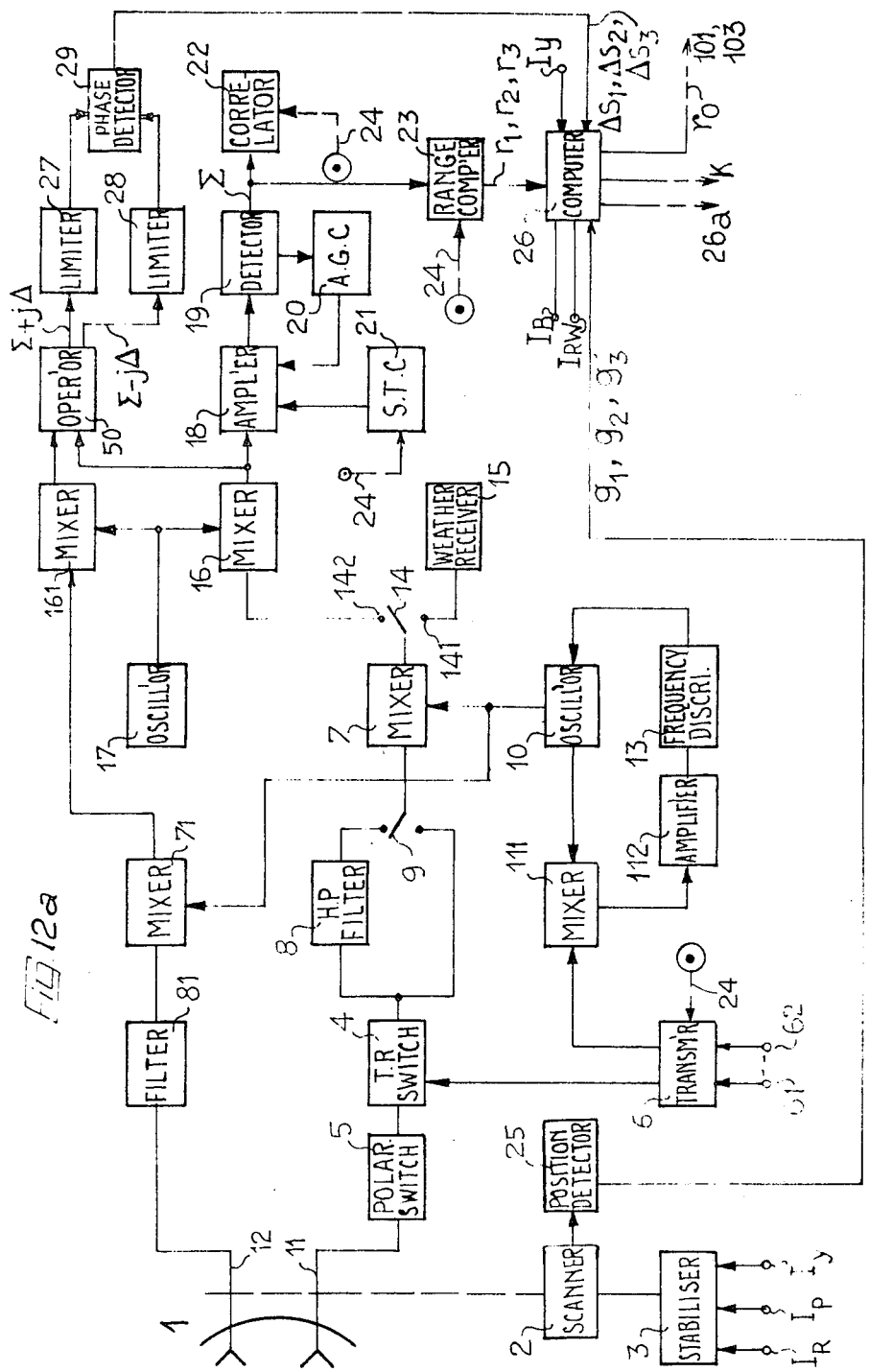
FIGS. 12a and 12b are block diagrams of an improved ILM system according to the invention.
Figure 12B:
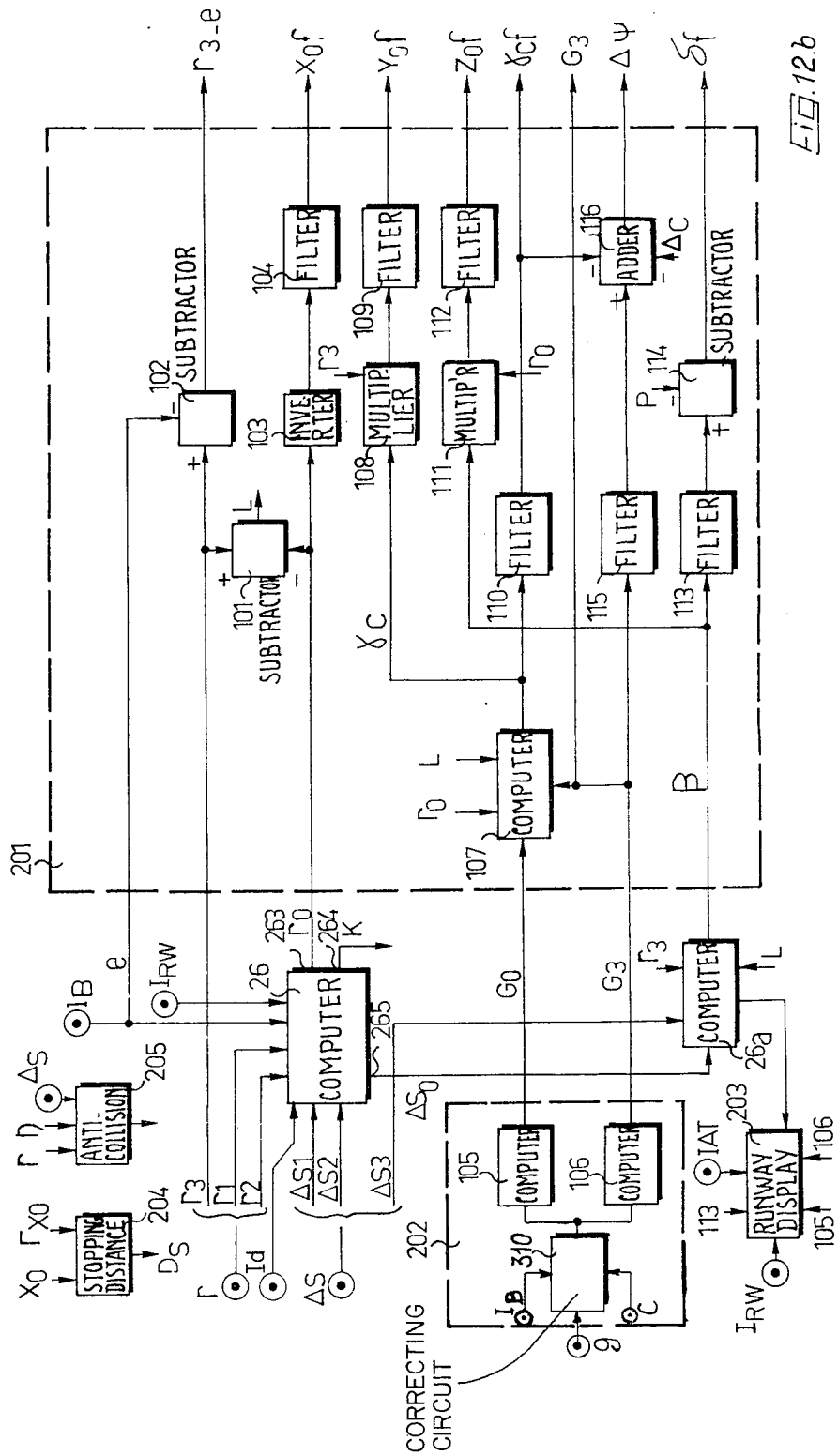
Figure 13:
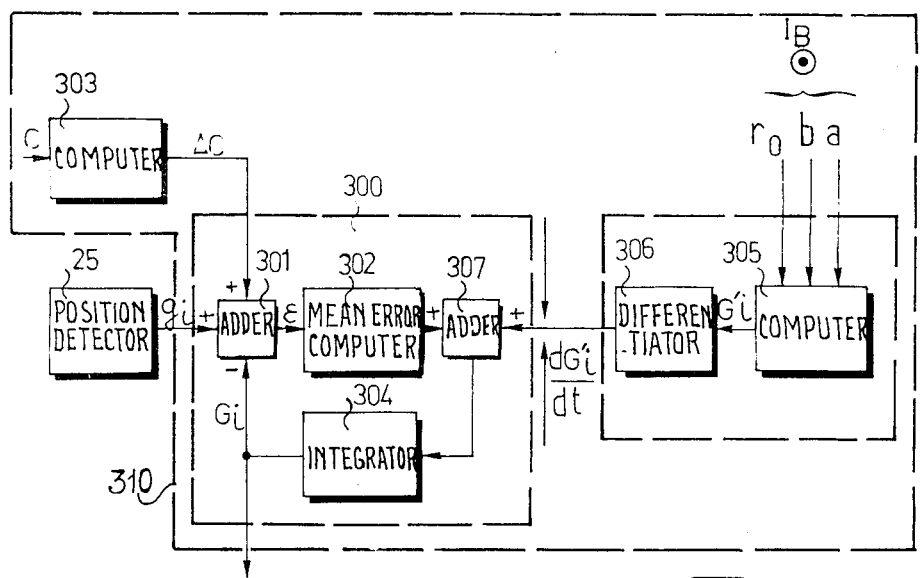
FIGS. 13, 15, 16, 19 and 21 are circuit diagrams of particular blocks of FIG. 12.
Figure 14:
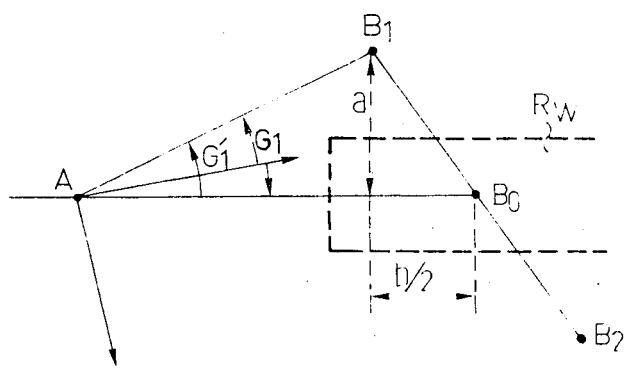
Figure 17:
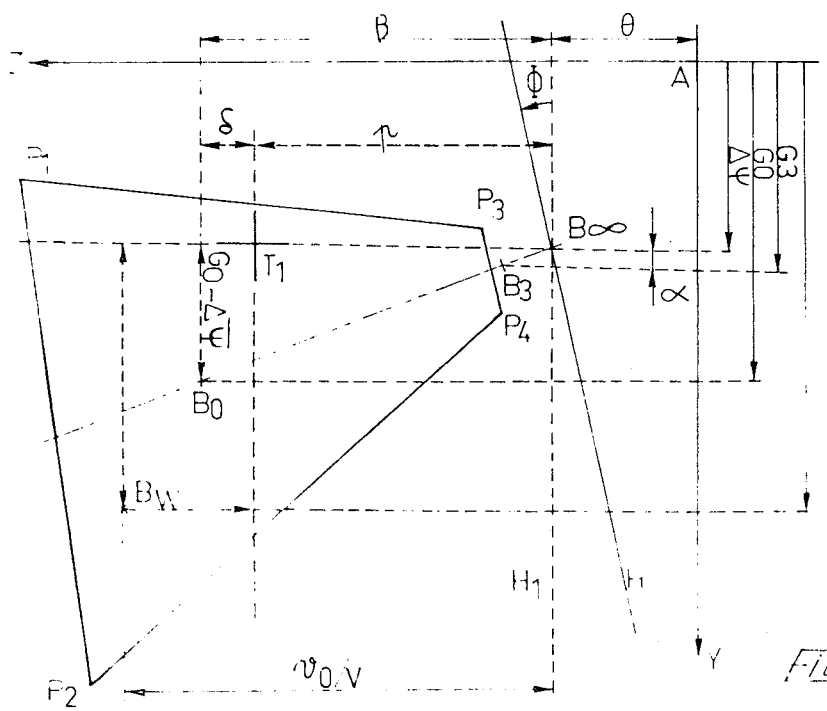
Figure 18:
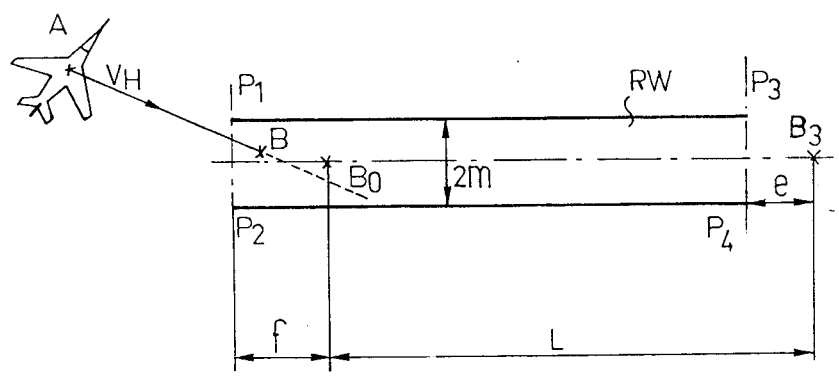
Figure 20:
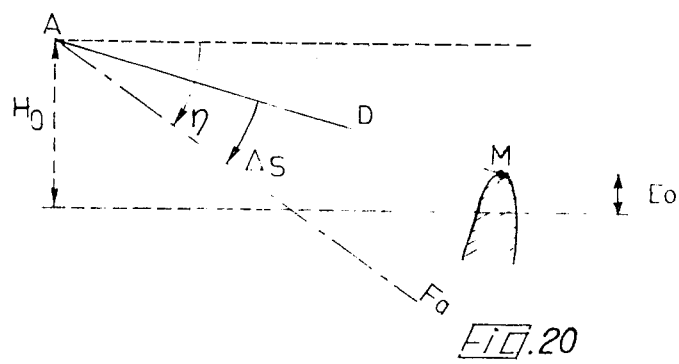

FIGS. 14, 18, and 20 show input parameters of the system shown in FIGS. 12 and 13; and FIG. 17 shows an example of a display system associated with the ILM system according to the invention.

Similar references designate similar elements throughout the various figures.

First, for the sake of clarity the reference trirectangular trihedrals necessary to an understanding of the invention will be defined. These trihedrals are shown in FIGS. 1, 2 and 3; namely the aircraft trihedral AXYZ, the measuring trihedral Axyz and the stabilized trihedral $Ax_1y_1z_1$ respectively.

Figure 1:
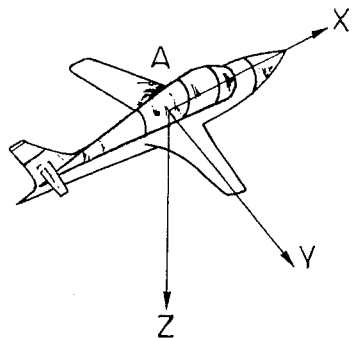
FIGS. 1 to 5 show the reference trihedrons employed in the following description.

The aircraft trihedral AXYZ shown in FIG. 1, as its name suggests, is fixed in the aircraft which is assumed to be reduced to the phase center of the antenna of the ILM. The axes AX, AY, AZ are the bocy axes; the axis AX is the longitudinal or roll axis of the aircraft, the axis AZ, perpendicular to AX, is in the plane of symmetry of the aircraft, it is the normal axis or yaw axis; the axis AY is perpendicular to the preceding axes and is the lateral or pitch axis.

Figure 2:
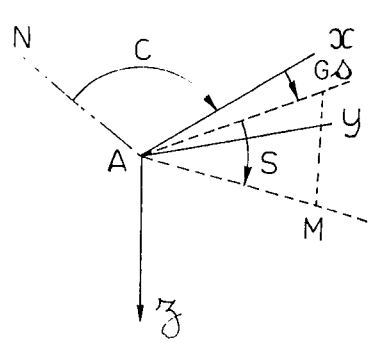
Figure 3:
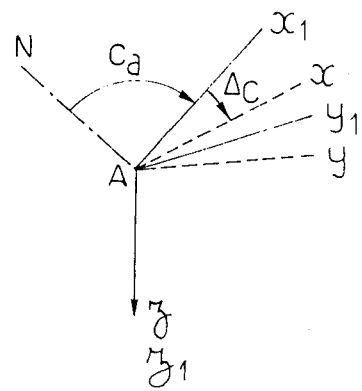
Figure 4:
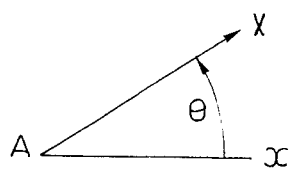

The measuring trihedral Axyz, shown in FIGS. 2, is that to which reference will mostly be made hereafter; it is a trihedral which is stabilized in pitch and roll, and is derived from the aircraft trihedral by two rotations. The first one is by $-\Phi$, relative to the longitudinal axis, where $\Phi$ is the lateral attitude angle, which is considered positive when the right wing of the aircraft is lower than the left wing. This rotation by $-\Phi$ brings the axis AY to Ay i.e. on the horizontal (shown in FIG. 5). The second rotation is by $-\theta$ being the longitudinal attitude angle considered positive when the aircraft is tail down, which brings the axes AX and AZ to Ax and Az which are respectively horizontal and vertical ($\theta$ is shown in FIG. 4) The stabilized trihedral $Ax_1y_1z_1$ shown in FIG. 3 is deduced from the measuring trihedral Ayxz by a rotation through $-\Delta C-$ about the axis Az, the axes Az and $Az_1$ being coincident; $\Delta C$ represents the instantaneous variation in the course, which is positive when the aircraft deviates from its route by turning in the clockwise direction. FIGS. 2 and 3 show the relation between the courses C and Ca i.e. the angles the axes Ax and $Ax_1$ make with the north direction AN, the relation between the bearings $G_s$ and $G_{s1}$ and that between ... the angles of elevation S and $S_1$ of any point M relative to the two trihedrals, One has:

$$C = Ca + \Delta C$$

$$G_{s1} = G_s + \Delta C$$

$$S_1 = S.$$

Figure 5:
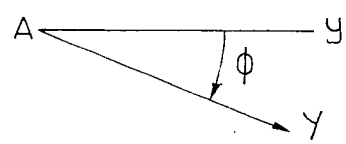

FIGS. 4 and 5 set forth the angle of pitch $\theta$ and the angle $\Phi$, or the longitudinal and lateral attitudes. The plane of FIG. 4 is the vertical plane containing the axes Ax and AX and the plane of FIG. 5 is the plane perpendicular to AX at A. FIGS. 6 and 7 show the aircraft A in final approach, ready to land upon the runway RW.

The point $B_o$, on the runway axis, is the theoretical point of touchdown which is located around 300 m from the runway threshold E; the vertical plane W passing through the runway axis defines the vertical plane of alignment, the localiser transmitter of the conventional instrument landing system or ILS system, if any,being located upon the runway axis at B, beyond the far end runway threshold F.

The axis $TB_o$, contained in the plane W and making the angle $p$ with the runway axis, represents the theorical glide path, which is the intersection between the plane W and the theorical glide path plane. The intersection $CC'$ of this plane with the runway passes through $B_o$ and is perpendicular to the runway axis. The conventional glide path transmitter of the ILS system is located upon this pivot line.

These various reference elements, are well known to those skilled in the art of aerial navigation,and all the details thereon can be found in a variety of text books such for example as: the OACI standards, "Avionics" and ... "Navigation Systems," edited by KAYTON AND FRIED, and published by JOHN WILEY & SONS, 1969 Library of Congress, Card number 69-13 679, P 528,and followings. The plane $W_1$ is the vertical plane, perpendicular to the runway axis, containing the aircraft A at the instant considered (it is assumed, of course, that the aircraft is a point in space, the phase centre in fact of the airborne radar antenna) and $A_1$ is the point at the same altitude, $Z_A$, as the aircraft, which is contained simultaneously in the planes W and $W_1$.

The parameters required for the guidance of the aircraft are the deviation angles $\gamma$ and $\delta$ :

$\gamma = \widehat{A_1B, BA}$, i.e. the angular deviation in the azimuthal plane and $\delta = \widehat{TB_o, B_oA_1}$, i.e. the angular deviation in the elevational plane, seen from $B_o$, $A_1$ being the normal projection of A on the plane W.

Angle p is generally of the order of 2° to 3° and the deviation angles $\gamma$ and $\delta$ should not exceed 2° and 5° respectively.

Figure 10:
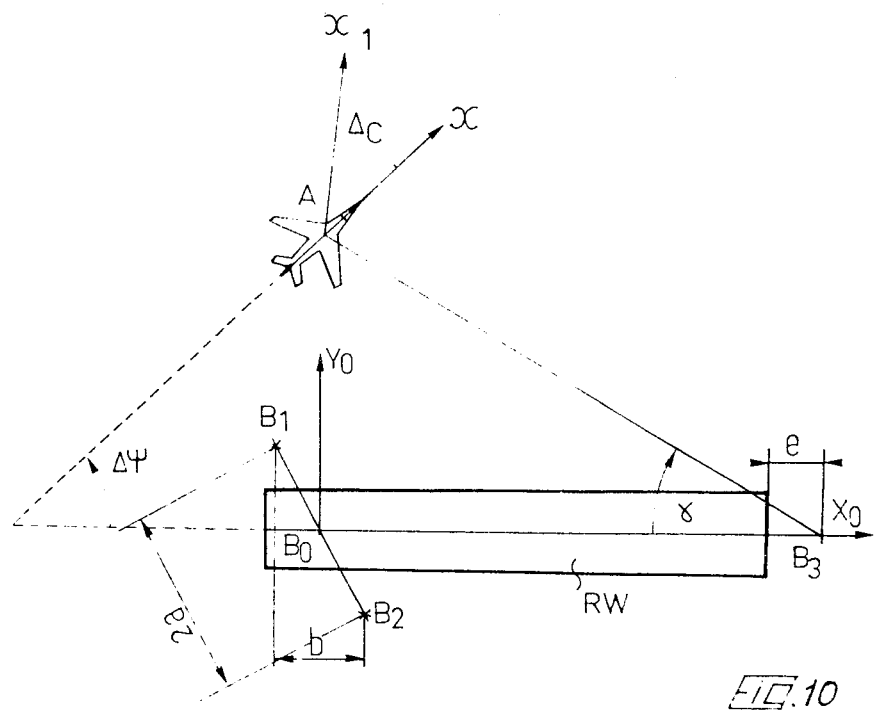
Figure 11:
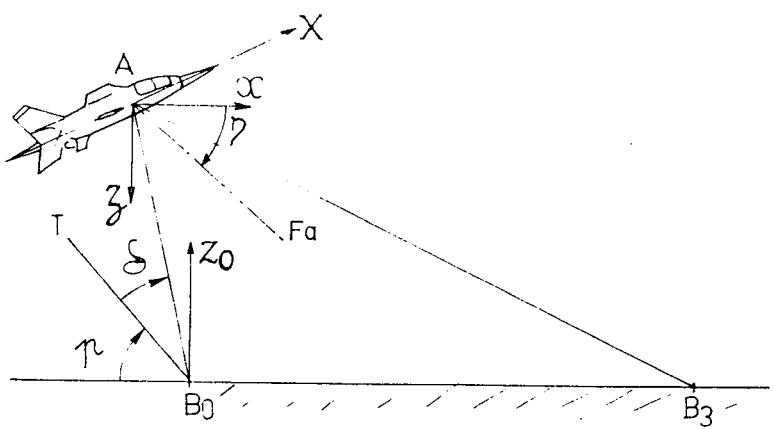

The position of the aircraft is fully defined by the co-ordinates $X_o$, $Y_o$, $Z_o$ of A in the rectangular axes system $B_oX_oY_oZ_o$, where $B_oX_o$ is carried by the axis of the runway RW and $B_oY_o$ is perpendicular to $B_oX_o$, the axis $B_oZ_o$ being vertical and extending upwardly. These axes are shown in FIGS. 10 and 11 ; the orientation of the measuring trihedral Axyz is fully defined by the angle $\Delta\psi$, made by the projection of the axis Ax on the horizontal plane (FIG.10) with the axis $B_oX_o$. In order to simplify the drawing, Ax designates in FIGS. 10 and 11 in fact the projection of Ax respectively on the horizontal plane containing the runway and on the vertical plane W passing through the axis of the runway. The orientation in elevation of the radiation axis of the antenna of the system is defined by the angle $\eta$ (FIGS.9 and 11) that the projection AFa of this axis on the plane W makes with Ax. The projection of the axis Ax $_1$ of the stabilised trihedral is represented with the same references at $Ax_1$, FIG. 10.

The figures have not been drawn to scale for purposes of clarity ; in particular, the angles $\delta$, $\gamma$ and $\Delta\psi$ and the co-ordinate $Y_o$ of the point A are usually much smaller than shown.

The runway is equipped with a reflector assembly located so as to define the runway axis and the vertical plane W. Preferably this assembly is formed by the three reflectors $B_1$, $B_2$ and $B_3$, shown in FIGS. 7, 10, 11, 14 and 18, reflector $B_3$ being located at B (FIG.6) and reflectors $B_1$ and $B_2$ being on a straight line with the touch down point $B_o$ and being symmetrical with each other with respect to that point.

This reflector system cooperates in a known manner with the ILM system. To this end the reflectors can be active reflectors, retransmitting received signal at a different frequency, thus avoiding guidance errors due to interferences with echoes from the ground or from other targets such as other landing aircraft.

The aircraft A is equipped with a long-range radar system of the recurrent pulse type ; to this end, its wavelength is made relatively long, for example in the order of 3 cm.

During cruising flight, the system operates as a weather or "meteo" radar : it produces pulses of duration $\tau_1$, for example of the order of 5$\mu$s length,and scans through an azimuthal angle of around ± 90° at a scanning rate in the order of 60°/sec. The operator can select the elevational angle of the antenna.

The carrier frequency of the received echoes is equal to the transmission frequency $f_o$ to within the Doppler frequency which is defined by the relative speed of the targets.

Conventional frequency changer, amplifier and detection circuits display upon a screen the radar map of the disturbances. Known arrangements make it possible to utilise the same circuits in order to display major geographical contours, such, for example, as coast lines.

During the landing, the scanning of the antenna in the azimuthal plane, is accelerated (boosted for example to 120°/sec.), and, at the same time, limited to a sweep range of ± 25°, the elevational angle of the antenna being fixed.

The length of the transmitted pulses is shortened to $\tau_2$ for example 0.4$\mu$s and the receiver circuits which will be described in more detail hereinafter with reference to FIG. 12, are now arranged to receive not the echoes of frequency $f_o$ but the echoes of different frequencies $f_1 = f_o + \Delta f$ (or $f_o - \Delta f$) returned by the reflectors or beacons $B_1$, $B_2$ and $B_3$, which are assumed to be active (frequency modulating) reflectors returning signals at frequency $f_1$.

The rolling and pitching movements of the aircraft are of course compensated for, either through displacing the antenna, or in the processing of the received signals.

The antenna of the system is designed for operating, during the reception, as a sum-difference monopulse antenna in elevation, the antenna either comprising two radiating apertures-one of which is not used when the system is operated as a weather radar —, or comprising a single aperture associated with known multimode excitation means.

The angles $g_1$, $g_2$, $g_3$ (FIG. 8) of the axes $AB_1$, $AB_2$, $AB_3$ with the axis AX of the aircraft are known from the instantaneous position of the antenna at the moment the targets are detected.

These angles are determined to within some few milli-radians if the beam has a three-degree aperture angle. They enable the angle $\gamma$ to be roughly computed. The glide slope angle of the aircraft being small, the computation of $\gamma$ can be effected in the horizontal plane, shown in FIGS. 8 and 10, $A_H$ being the projection of A onto said plane. As long as the aircraft is far away from the runway, the conditions set out in the Figure are strictly correct and $\gamma = r_o/L ( g_o - g_3 )$, $r_o$ being the distance $A_HB_o$ which can be equated to the distance $A B_o$ measured by the radar, L being the distance between $B_o$ and $B_3$ and $g_o$ being equal to $g_1 + g_2/2$. As the aircraft gets closer, this approximation ceases being valid because the azimuthal angle of the point $B_o$ can no longer be equated to $g_1 + g_2/2$. Then the relationship :

$$\gamma = r_o/L (g_o - g_3 ) + b/4L (g_2 - g_1 ) \quad (1)$$

is being valid, where b is the distance $B_2B'_2$, that is to say the projection onto the runway axis of the distance $B_1 B_2$, which is about 180 m (FIG.10).

The distance $A_1A$ (FIG. 6) being small in regard of $A B_o$ (FIG. 6) the angular deviation $\delta$ can be computed quite simply from the elevation deviations $\Delta S_o$ and $\Delta S_3$ supplied by the monopulse output of the radar, as FIG. 9 shows : p being the theoretical glide slope and $\beta$ the elevational angle of $A_1$ seen from $B_o$, the relationship between $\delta$ and $\beta$ is : $\delta = \beta - p$ in other words $$\delta = r_3/L (\Delta S_o - \Delta S_3 ) - p \quad (2)$$

$r_3$ being the distance $A_1B_3$ which is similar to the distance $AB_3$ measured by the radar.

The computations of $\gamma$ and $\delta$ according to the expressions (1) and (2) which are simple arithmetic relationships (subtractions, multiplications, additions), can be made in any known manner, either digitally or in analogue form. FIGS. 12a and 12b are the basic diagram most generally employed, of an ILM radar system in accordance with the invention.

For the sake of clarity, the figure representing the whole system according to the invention has been split into two parts, respectively 12a and 12b, the part 12a including conventional ILM radar receiver circuits, flight parameters data inputs, and angle computing circuits, and part 12b including essentially the circuits improved, according to the invention, some of the conventional parts of the system appearing on part 12b for the sake of clarity.

The system according to the invention comprises a certain number of inputs ; generally speaking, there are three groups of inputs to which are applied input signals either supplied by other on board instruments, or issued from maps or charts available to the pilot, and relating to the considered runway.

i. The group of flight parameters inputs ; the supply of these parameter is entirely conventional aboard modern commercial aircraft (aerodynamic and/or gyroscopic and/or inertia systems are used). The parameters used here are a. the roll angle $\phi$
b. the pitchangle $\theta$
c. the yaw angle $\Delta C$
d. the drift angle $d$.

The three first mentioned angular parameters are related to the aircraft attitude and are applied at inputs $I_R$, $I_p$ and $L_Y$; these three inputs are repeated in group at $I_{AT}$ for the sake of clarity.

The drift angle parameter input is shown at $I_d$ (FIG. 12a).

ii. The group of the runway parameter inputs for introducing in the computing circuit values representing the characteristics of the runway. The values vary from one runway to the next and are generally manually entered into the circuits by the pilot or the co-pilot which is supplied with charts of the latters. They are : the lengh L, the threshold length $f$, and the width 2 m of the runway, shown at FIG. 18. These parameters are available at the general input $I_{RW}$ (FIG. 12b).

iii. The group of the reflector parameters, namely parameters $a$, $b$ and $e$ shown FIGS. 10 and 18. These parameters are available at input $I_B$ FIGS. 12a and 12b.

The form under which the input signals are available on board and in which they are supplied to the various inputs depends essentially on the kind of circuits to which they are applied (digital or analog circuits, and, if analog, dc or ac circuits).

This point will not be discussed here in detail, it being now entirely conventional for those skilled in the art to convert optical signals into electrical, ac signals into dc signals, voltage signals to amplitude signals, pulse signals to continuous signal, digital signals to analog and vice-versa.

The inputs having been defined, the system will now be described. It comprises an antenna 1 which can operate as an elevation monopulse receiver antenna, a scanner 2 for controlling the displacement of the antenna in azimuth at any one of two displacement speeds with any one of two amplitudes respectively associated therewith, the displacement of the antenna being stabilised against rolling and pitching in a conventional way, by a stabiliser device 3 whose control inputs are $I_p$ and $I_y$. The antenna is illustrated symbolically as having two radiator elements, corresponding to the said monopulse function, butthis does not mean that it is necessarily geometrically formed of two elements : as already stated, those skilled in the art will appreciate that a single radiator source of the multimode type can produce sum and difference signals simultaneously.

The antenna 1 has a transmit-receive channel or sum channel, 11, and a reception-only channel or difference channel 12. The channel 11 is coupled to a transmit-receive switch, 4, for example an UHF circulator, and this, possibly through a polarisation switch 5, as is the case with most weather radars.

The "transmit" terminal of the switch 4 is coupled to a transmitter 6 ; the latter supplies UHF carrier pulses at a carrier frequency of 104 Mc/sec for example and at a repetition frequency $FR_1$, for example 200 c/s or $FR_2$ (for example 2500 c/s, possibly wobbulated) of duration $\tau_1$ (for example 5 $\mu$s) in the case of $F_{R1}$ and $\tau_2$ (for example 0.4 $\mu$s), in the case of $F_{R2}$ : to this end the transmitter has a pulse width control input 61, the control being manual and/or automatic, if the aircraft is equipped with a tracking computer which produces a signal for the input 61 when the cruising phase of the flight terminates, and also comprises an input 62 controlling the repetition frequency, the two inputs being synchronised manually or automatically, as symbolically shown by the dashed lines between terminals 61 and 62.

Such antenna systems and transmitters are known and described for example in the following documents : German Pat. No. 1, 234, 811; U.S. Pat. No. 3, 146, 448; U.S. Pat. No. 3, 177, 484; and French Patent No. 950, 799.

The receiver terminal of the switch 4 is coupled to a mixer 7 either directly (weather radar operation), or, for the landing phase, through a high-pass UHF filter 8, whose cut-off frequency lies between $f_o$ and $f_1 = f_o + \Delta f$; a switch 9 is provided for this purpose.

The mixer 7 is coupled to the output of a first oscillator 10 of frequency $f_o + F_I$, $F_I$ being the intermediate frequency of the weather radar receiver system. This oscillator is provided with automatic correction of the frequency $f_o$ through a conventional feedback loop comprising a mixer 111 coupled to outputs of the transmitter and of the local oscillator 10, an amplifier 112 and a frequency-discriminator 13 centered on the frequency $F_I$, for example 30 Mc/s.

The output of the mixer 7 is coupled to the input of a switch 14 with two outputs 141 and 142, the output 141 being coupled to a conventional weather radar receiver 15, which, in the conventional way, comprises an ordinary video channel, an "isocontour" channel (this, in particular, being equipped with means for controlling the gain as a function of the target range) and a PPI display. The setting of the switch 14 is carried out synchronously with the control, at 61, of the transmitter, the switch being in position 141 when the transmitter is supplying pulses of longer duration $\tau_1$ and in position 142 when the transmitter is supplying pulses of shorter duration, $\tau_2$.

The terminal 142 is coupled to a second mixer 16 which is supplied on the other hand with the output signal from a second local oscillator 17, of frequency 215 Mc/s for example. The output signal from this mixer, of frequency 45 Mc/s, in this example, afteramplification at 18 and detection at 19, forms the video sum signal; preferably a known kind of dual automatic gain control, is carried out in device 20, operating as a function of the mean noise level and in sensitivity time control device, 21, as a function of the target range.

In the presence of other aircraft on final approach and equipped with the same system of approach radar operating at substantially the same frequency, the responses from targets to the pulses coming from one and the same aircraft will be identified in the conventional way by correlation, for example correlation of three successive echoes, at 22 ; the output signals from correlator 22 can then, likewise in known fashion, be used to control the opening of range gates which, when the receiver has locked onto the target echoes, will ensure that these targets are range tracked.

These signals, too, serve in the conventional way to determine the ranges $r_1$, $r_2$, $r_3$ between the aircraft and the reflectors : to this end, they are applied to a range computer 23 synchronised by the general pulse radar synchronising device, 24, which of course likewise controls the transmitter and the weather radar receiver 15.

The azimuth angles $g_1$, $g_2$, $g_3$ are derived directly from a position detector . . . 25 which senses the antenna position and is coupled to the scanner 2.

These data as well as the range data are supplied to an arithmetical computer 26 which is coupled to the yaw input $I_y$ and is supplied on the other hand with the elevational data $\Delta S_1$, $\Delta S_2$, $\Delta S_3$ supplied in the manner described hereinafter.

Let it be assumed that the computer is programmed for a given glide slope and a given runway configuration. In any other case, it comprises $I_B$ and $I_{RW}$ inputs by means of which are selected the glide slope p and the parameters L and b.

The elevation data is obtained from sum and difference signals supplied by the monopulse antenna. To this end, the difference channel 12 is coupled to a filter 81 identical to the filter 8, coupled to a mixer 71 identical to the mixer 7 ; the output of the mixer 71 is coupled to the mixer 161 identical to the mixer 16. An operator 50, the inputs of which are coupled to the outputs of the mixers 16 and 161, forms the signals $\Sigma + j\Delta$ and $\Sigma - j\Delta$, the symbol $j$ representing a phase shift of $\pi/2$.

These signals are amplified and limited, respectively, at 27 and 28, and the amplitude-phase detector 29 coupled to the outputs of amplifier-limiters 27 and 28 produces the elevation deviations signal $\Delta S_i$ ($i = 1, 2, 3$) which is supplied to the elevation input of thp computer 26 as shown.

This computer can be designed in a known manner: it will comprise a certain number of storage positions in which various values of the signals ri ($i = 1, 2$ or $3$), $\Delta S_i$ and $g_i$ are recorded, the addressing of the computer store position being of course synchronised by the radar sync system (not shown for the sake of clarity), which supplies the transmitter control pulses at 62. The computer further comprises arithmetic operation circuits effecting the computation of $\Delta S_o$, a value of the $\Delta S$ angle related to point $B_o$, available at the output 265 (FIG. 12b), the computation of $r_o$, the distance of the aircraft to point $B_o$, and the computation of a coefficient K, which will be explained hereinafter and is necessary for the computation of angle $\gamma$. As it will be shown, all these computations involve only pure arithmetic operations (addition, subtraction, multiplication and division) and are therefore computed by means of circuits readily obtained by those skilled in the art of computers.

The distance $r_o$ is substantially equal to $$(r_1 + r_2/2) - (a^2 - b^2/4/r_1 + r_2),$$

where $a$ and $b$ are made available to the computer at inputs $I_{RW}$, the coefficient K being equal to the second term, i.e.

$$K = a^2 - b^2/4/r_1 + r_2$$

The angle $\Delta S_o$ may be taken within reasonable approximation equal to ($\frac{1}{2} r_o$) ($r_1 \Delta S_1 + r_2 \Delta S_2$) + $\eta \cdot K$ where $\eta$, shown in FIG. 11, is a fixed value entered in the computer circuit.

For the sake of clarity circuit 26 is shown again in FIG. 12b, where $\Delta S$, $r$, $g$, represent globally the signals $r_i$, $\Delta S_i$, $g_i$.

Each general input thus designated permits the display of several parameters either in series or in parallel, each general input representing an assembly of terminals respectively corresponding to the various designated parameters.

The system further comprises five general computing units: The unit 201 which determines :
- the co-ordinates $X_o$, $Y_o$, $Z_o$, of the aircraft relative to the runway trihedral ;
- the angle $\Delta\psi$ or "decrabbing" angle which is the angle by which it is necessary to rotate the aircraft about the normal axis for making the aircraft longitudinal axis parallel to the runway axis at the very instant when the wheels touch the ground ;
- the corrected values $\gamma_c$ and $\delta_c$ of the characteristic angles $\gamma$ and $\delta$ ;
- the distance $r_3-e$ of the aircraft from the end of the runway opposed to the landing point ;

The unit 202 which determines the corrected values of the bearings of the reflectors and of the point $B_o$, which values are employed in the unit 201;

The unit 203 or runway unit which determines, from the characteristic parameters of the runway and from those supplied by the foregoing units, the parameters necessary for a synthetic representation of the runway, which may possibly be associated with the representation of other flight parameters; and the unit 204 for calculating the predicted stopping distance DS, and the anticollision unit 205.

The signal $r_o$ available at the output 263 of computer 26 is subtracted from $r_3$ in the subtractor 101 so as to furnish the value L representing the distance $B_o - B_3$. Indeed the values $a$, $b$, and $e$ are often data which are identical from one runway to another, whereas the distance L can vary to a large extent (hundreds of meters or more) and it is of interest to determine it from measurements rather than to display it.

In fact, its determination may constitute a test.

The signals $e$, of the input IB, and $r_3$, of the input r, are subtracted in the subtractor 102.

The output signal of the subtractor 102, which is equal to $(r_3-e)$, represents the distance between the aircraft and the end of the runway opposed to the landing point and is a precious indication not only in initial and final approach but also during the running of the aircraft on the runway.

The co-ordinate $X_o$ of the aircraft may be considered equal to $r_o$ in absolute value. The filtered value of $X_o$, namely $X_{of}$ is furnished at the output of the filter 104 which is connected in series with the inverter 103 at the output 263.

The value of $\gamma$ is calculated from the corrected mean values $G_1$, $G_2$, $G_3$ of the bearings $g_1, g_2, g_3$ in response to n successive pulses upon each passage of the beam of the antenna respectively through the reflectors $B_1, B_2, B_3$. A first computer 105 to which are respectively applied the compensated signals $g_{1c}$, $g_{2c}$ determines the values:

$$G_1 = (1/n) \sum_{i=1}^{i=n} g_{1ci} \quad G_2 = (1/n) \sum_{i=1}^{i=n} g_{2ci}$$

and $G_o = \frac{1}{2}(G_1+G_2) + b/4 \ (G_2-G_1)$

The values of $g_1$, $g_2$, $g_3$ supplied by detector 25 are compensated for the aircraft displacement in unit 310 which has inputs for $g_i$, for parameters $r_o$, a and b (input $I_B$) and for parameter C.

The computer 106 determines the signal $$G_3 = \frac{1}{n} \sum_{i=1}^{i=n} g_{3ci}.$$

The computer 107, having four inputs respectively connected to the outputs of the computers 101, 105 and 106 and to output 263 determines the corrected signal $$\gamma c = r_o/L \ (G_o - G_3) \ ,$$

The circuits 105, 106 and 310 constitute the unit 202. The co-ordinate $Y_o$ of the aircraft is determined in the multiplier 108 which receives the signals $r_3$ and $\gamma_c$ respectively; the filtered value, namely $Y_{of}$, is furnished at the output of the low-pass filter 109; the low-pass filter 110, connected in series with the output of the circuit 107, furnishes the filtered signal $\gamma_{cf}$.

The co-ordinate $Z_o$ of the aircraft is obtained by forming in the multiplier 111 the product $\beta \cdot r_o$ which is thereafter filtered at 112. The value of $\beta$ is obtained in an arithmetic computer 26a, having four inputs respectively for signals $\Delta S_3$ (from circuit 29), for signal $\Delta S_o$ (from computer 26), for signal $r_3$ (from computer 23) and for signal L (from circuit 101); it elaborates signal $\beta = r_3/L \ (\Delta S_o - \Delta S_3)$, which is fed to the multiplier 111 and to the filter 113.

The signal $\beta$, filtered at 113, is applied to the subtractor 114 which receives also signal p and furnishes the filtered signal $\delta f$ equal to $\beta - p$.

The filtered signal $\gamma_{cf}$, at the output of filter 110, and $G_{3f}$ at the output of filter 115 and signal $\Delta C$ from the heading data generator are algebraically added in the adder 116 which furnishes the signal $\Delta \psi = G_3 - \gamma c - \Delta C$, the "decrabbing" signal, since it represents the angular amplitude of the yaw movement required, when the wheels touch down, for making the axis of the aircraft parallel to the runway axis and ensuring that the aircraft runs correctly along the ground. The circuits 101 to 104 and 107 to 116 constitute the aforementioned unit 201 which furnishes the characteristic parameters of the position and of the attitude of the aircraft and precise values of the angular deviations $\gamma$ and $\delta$.

The signals $r_3/L \ (\Delta S_o - \Delta S_3)$ at the output of the circuit 26 a, the signals $G_o$, $G_3$ from the calculators 105 and 106, the signal $\beta_f$ from the filter 113, the signals $\theta$, $\Delta C$ and $\Phi$ (input $I_{AT}$) from the gyroscopic unit of the aircraft (not shown) and the parameters defining the runway relative to the reflectors, are applied to the unit 203 which determines the parameters necessary for the representation of the runway in perspective, which representation is known as a synthetic display in which the runway appears as it would be viewed if visibility so permitted.

The principle of the representation of the runway is known.

It is described in patents filed by the Applicant and in particular in U.S. Pat. No. 3,486,010 and will not be described here, since the present device has for its sole purpose to furnish the parameters necessary for this representation.

The predicted stopping distance Ds is calculated in the unit 204 connected to the output $X_o$ of the unit 201 and to the accelerometer or to the inertia unit of the aircraft furnishing the acceleration $\ddot{X}o$ along $B_o X_o$.

The anticollision function is performed by the unit 205 coupled to the inputs $r$, $\eta$ and $\Delta S$.

The various elements of the unit 201 are essentially conventional elements: algebric adders (101, 102, 116), inverter (103), multiplier (108, 111), low-pass filters (104, 109, 110, 112), or conventional combinations of such elements (calculator 107).

The bearings $g_1$, $g_2$, $g_3$ are of course measured at different instants; further, the axis of the aircraft and consequently that of the radiation pattern of the antenna is not strictly stable. The calculations of $G_o$ and $\Delta \psi$ involve the bearings of the three reflectors and it is therefore well necessary to compensate for the effect of the displacement of the aircraft between the measurements and for the effect of possible yaw movements on the computed $G_o$ and $\Delta \psi$ values.

FIG. 13 shows in detail the bearing correcting circuit 310. The position detector ... 25 indicates a value $g_i$ (equal to $g_1$, $g_2$, $g_3$ depending on the illuminated reflector), at the instant of measurement (the transmission and reception instants are made to coincide since the speed of the aircraft, however high it may be, is at the most equal to a few millionths of the speed of propagation of electromagnetic waves).

Assuming first that the course is constant and that the aircraft is stationary, the mean bearing determined with n echoes is obtained by the loop 300 (one loop is provided for each bearing $g_i$) which includes a subtractor 301 furnishing the signal $\epsilon = g_i - G_i$ (wherein $i = 1, 2, 3$), a mean error computer device 302 which calculates $$\epsilon_0 = \frac{1}{n} \sum_{j=1}^{j=n} \epsilon j$$

in which $j = 1, 2, \ldots n$, an integrator 304 which calculates $$G_i = \int \epsilon_0 dt.$$

In fact the course of the aircraft at the moment of measuring is $C = \bar{C} + \Delta C$ ; the value $\Delta C$ is calculated from C in the computer 303 which forms the mean value $$\left| \bar{C} = \frac{1}{T} \int_0^T C \, dt \right|$$

and the difference $C - \bar{C}$ , the circuit 303 being constructed very simply , for example by means of a resistor and a capacitor if the signal C is a continuous signal ; the signal $\Delta C$ is added to $g_i$ in the algebraic adder 301. If the mean course or heading of the aircraft relative to the runway , $\Delta \psi$ , is constant or varies slowly and if the aircraft is near to the axis of the runway, the correction of $G_i$ as a function of the displacement of the aircraft can be achieved while assuming the derivatives of $G_i$ and of $G'_i$ to be equal $G'i$ (FIG.14), being the bearing of the reflector Bi relative to the axis of the runway, assuming that the aircraft is in the vertical plane of this axis ($Y_o = 0$) , this bearing $G'i$ being calculated from $r_o$ , b and a in the computer circuit 305 by the relations $G'_1 \neq \neq$ arc tan $a/r_o-b/2$   $G'_2 \neq \neq$ arc tan $a/r_o+b/2$ The differentiator . . . 306 furnishes $dG'_1/dt$ which is added at 307 to the mean value $\bar{\epsilon}$ . For $i = 3$, $G_3 = G'_3$ and there is no correction . These dynamic corrections are exact only so long as the aircraft A is in the vertical plane of the axis of the runway and so long as $\Delta \psi$ is substantially constant.

Figure 15:
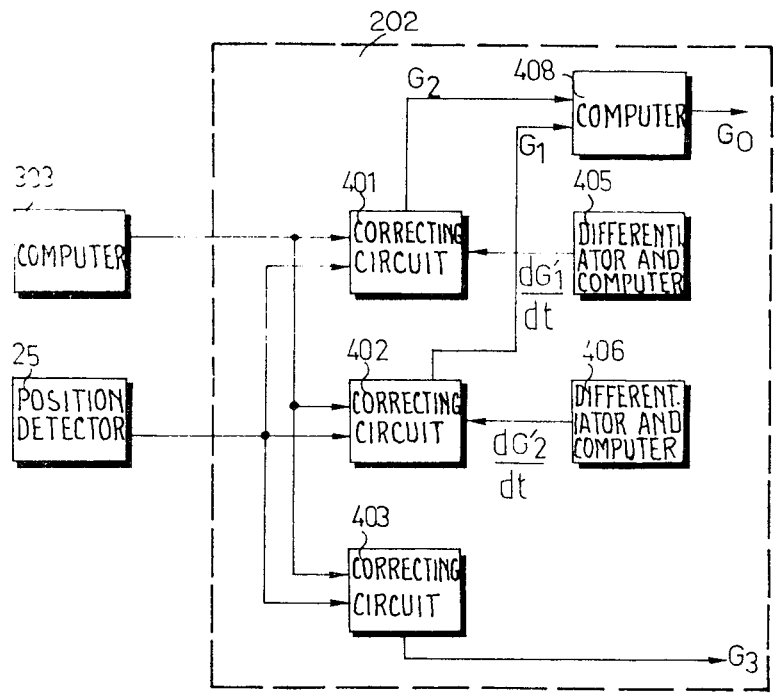

Now, $\Delta \psi$ is determined essentially by the component of the wind along $B_o Y_o$ and varies in the course of the descent with the altitude of the aircraft, which results in a residual error which is, however, small in the final landing stage. The block-diagram of the unit 202 determining the bearings therefore includes as shown in FIG. 15 :

three correcting circuits 401, 402, 403, each of which has a loop identical to the loop 300, two differentiator and computer circuits, 405 and 406 for $i = 1$ and 2, each of which being similar to circuits 305 and 306 of FIG. 13, an arithmetic computer 408 , coupled at the outputs of the $G_1$ and $G_2$ correcting circuits and effecting the computation $G_o = G_1 + G_2/2 + b/4_r$  $(G_2 - G_1)$ The synthetic display of the runway can either be an image projected to infinity parallel to the direction in in which the pilot is supposed to look (namely the direction in which he would look at the runway if it was visible), that is, an image which is superimposable on the runway ( "head up" display) or an image formed on an indicator placed on the instrument panel ( "head down" display). In the latter case, the apparent diameter of the image of the runway is determined by the available space.

In both cases, the parameters necessary for the presentation of the runway are determined in the unit 203 from the angular and distance data defining the altitude of the aircraft, its position relative to the axis of the runway defined by the points $B_o$ , $B_3$ , and from the geometric data of the runway (position of $B_o$ and $B_3$ relative to the four corners of the runway for example). The angles and distances in question are furnished by the previously described circuits (bearings $G_o G_3$, angles $\Delta \psi$ and $\beta$, angles of elevation $\Delta S_o$ and $\Delta S_3$ ) by the (for example gyroscopic) navigation unit (attitudes $\theta$ and $\tau$ variation in the heading or course $\Delta C$ ) ; the data relating to the geometric configuration of the runway are displayed, for example manually, for each landing.

In addition to the synthetic display of the runway, the indicator connected to the outputs of the unit 203 can also represent in the conventional manner the axis of the runway, the horizon, the theoretical path AT, the ground velocity vector and generally any other parameter available by other flight and navigation aids.

However, the number of parameters represented on this indicator will be limited so as to avoid an excessive complication of the display of the runway.

FIG. 18 shows the runway and the projection of the aircraft on the ground ; $V_H$ is the projection of the speed of the aircraft relative to the ground on the horizontal plane.

The runway can be defined by the co-ordinates of the four points $P_1$ , $P_2$ , $P_3$ , $P_4$ relative to the aircraft trihedral.

The relative runway-reflectors arrangement is completely defined (FIGS. 14 and 18) by the parameters e (distance between $B_3$ and the line $P_3$ , $P_4$ ) , L (distance $B_o B_3$ ) , 2a, b (projection of $B_1$ , $B_2$ parallel to the axis of the runway) ,$f$ (distance between $B_o$ and the line $P_1$, $P_2$ , and 2m , the width of the runway.

Figure 16:
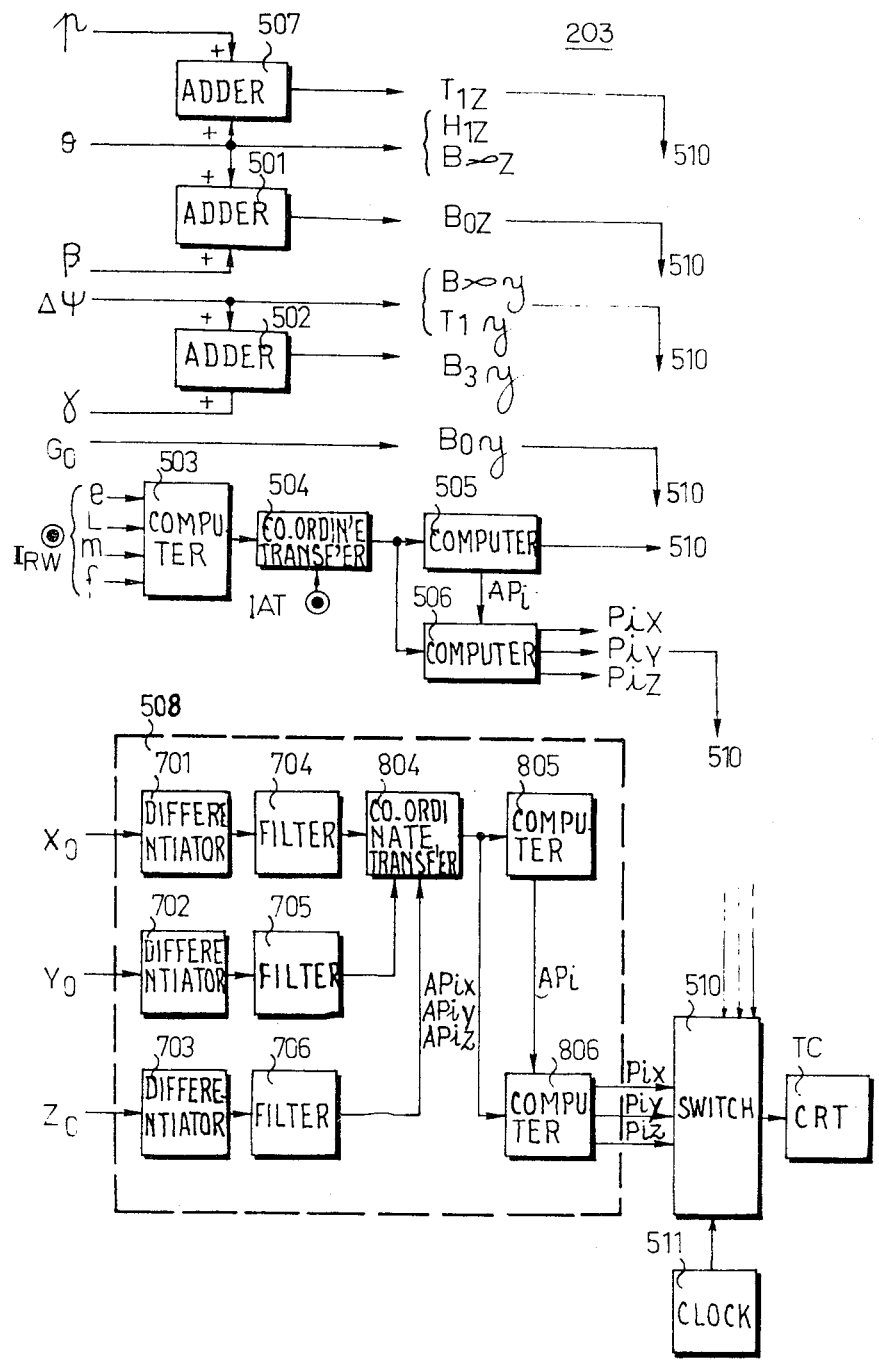

FIG. 16 is a block diagram of an embodiment of the circuits 203 for determining the parameters of the runway display and FIG. 17 represents the synthetic runway. The axes AY and AZ are the body axes (i.e. fixed in the aircraft); they are not necessarily displayed (in particular if a head-up representation is used) , but they have been included in the Figure so as to facilitate the explanation of the construction thereof.

The angles of elevation are low when the aircraft is approaching the runway (at the most a few degrees) and the apparent diameters are calculated in the only horizontal plane).

It will be recalled that the visualisation is achieved by means of cathode-ray tubes and that the different deviations along AY and AZ are obtained by applying voltages proportional to the desired deviations to the deflection plates of the tube.

Hereinafter, in order to avoid overloading the description excessively, the same expressions will be employed indifferently for designating the values of the co-ordinates of a point of the synthetic runway and the voltages, proportional to these co-ordinates, applied to the tubes.

The unit 203 comprises :

a first group of inputs connected to the devices (for example a gyroscopic unit) furnishing the angles $\Delta C$ , $\theta$ and $\Phi$ (input $I_{AT}$) ;

a second group of inputs connected to the outputs $G_o$ , $\Delta \psi$ , $\gamma$ , p , $\beta$ , ($\Delta S_o - \Delta S_3$) and $X_o$, $Y_o$, $Z_o$ of the devices 201, 202 ; and a third group of inputs for displaying the characteristics of the runway , parameters L, $e,m,f$ for example as indicated in FIG. 16 (input IRW) ; the characteristic L can either be displayed manually or obtained automatically from the output of the device 101 of the unit 201. In the absence of rolling, the horizon would be represented by the dotted line $H_1$ of the ordinate $\theta$ (FIG. 17).

The axis of the runway intersects, at point $B\infty$ , having the ordinate $Y = \Delta \psi$ (point at infinity on the axis)

, this line and the line H representing the real horizon, which makes the angle $\Phi$ with the line $H_1$.

The inputs $\theta$ and $\Delta\psi$ directly furnish the signals necessary for the representation of the line $H_1$ and of the point B∞. Hereinafter the co-ordinates along AY and AZ of each represented point will be marked by the indices Y AND Z.

Thus for the line $H_1$     $H_{1Z} = \theta$ and for the point B∞ 8 $B\infty_Z = \theta$    $B\infty_Y = \Delta\psi$ The point $B_0$ is viewed (FIGS. 10 and 11) at angle ( $\theta + \theta$ ) along AZ and at angle $G_0$ along AY.

An adder 501 (FIG.16) connected to the inputs $\theta$ and $\beta$ furnishes $B_{oz}$.

The reflector $B_3$ is defined on axis B∞$B_o$ by $B_{3Y} - B\infty_Y = \gamma$.

The adder 502 furnishes $B_{3Y}$.

An arithmetic computer 503 defines the co-ordinates of the points $P_1$, $P_2$, $P_3$, $P_4$ relative to the runway trihedral $B_oX_oY_oZ_o$ (FIG. 10).

The co-ordinates along AY and AZ in the aircraft trihedral A X Y Z are determined, from the co-ordinates related to the runway trihedral, in the co-ordinates transformer 504, which comprises in the known manner an assembly of multiplying and algebraic adding circuits, the co-ordinates $X_iY_iZ_i$ of a point $P_i$ ($i = 1, 2, 3, 4$) being obtained from the coordinates $X_{oi}Y_{oi}Z_{oi}$ by the relations of the following form $$X_i = a_1 X_{oi} + a_2 Y_{oi} + a_3 Z_{oi}$$
$$Y_i = b_1 X_{oi} + b_2 Y_{oi} + b_3 Z_{oi}$$
$$Z_i = c_1 X_{oi} + c_2 Y_{oi} + c_3 Z_{oi}$$

in which $a_1$, $a_2$, $a_3$, $b_1$, $b_2$, $b_3$, $c_1$, $c_2$, $c_3$ are the linear functions of the sine and cosine of the angles $\Phi$, $\theta$ and $\Delta\psi$ defining the relative directions of the two axes of the two trihedrals. The co-ordinates necessary for the representation of the runway are the apparent diameters, that is the ratio of the co-ordinates along AX and AY of the vectors $\vec{AP_1}$, $\vec{AP_2}$, $\vec{AP_3}$, $\vec{AP_4}$ to the distances $AP_1$, $AP_2$, $AP_3$ and $AP_4$ respectively.

A computer 505 determines these distances $AP_i$ from the co-ordinates of the vectors in accordances with the relations $(AP_i)^2 = AP^2_{iX} + AP^2_{iY} + AP^2_{iZ}$ where $i = 1,2,3,4$ and $AP_{iX}$, $AP_{iY}$, $AP_{iZ}$ are the co-ordinates of $\vec{AP_i}$ in the trihedral A X Y Z. The co-ordinates $AP_{iX}$ and $AP_{iY}$ are divided by $AP_i$ in the computer 506 which furnishes $P_{iY}$ and $P_{iZ}$.

Apart from the runway and the horizon, it is of utility to represent also the previously-defined point B and the point $T_1$ where the line parallell to $B_o$ T (FIG. 11), passing through A, intersects the runway. The position of this point relative to the runway enables ascertaining at each instant the location of the impact point if the descent slope is maintained equal to p, assuming that the elevation and bearing corrections are insufficient.

$AT_1$ being parallel to $B_oT$, the co-ordinates of the point $T_1$ along AY and AZ are respectively equal to $\Delta\psi$ and ( $\theta + p$ ). An adder 507 is connected to the inputs p and $\theta$ for this purpose. If the pilot does not modify the direction of the aircraft velocity, the point of impact, starting from the actual position, would be at B,i.e. at the point of intersection with the ground of the line parallel to the velocity vector and passing through A. The co-ordinates of the point B are $$B_Y = V_Y/V$$
$$B_Z = V_Z/V$$

in which $V_Y$ and $V_Z$ are the co-ordinates of the ground speed and V its modulus, $V_Y$ representing the drift angle of the aircraft. The values $V_X$, $V_Y$, $V_Z$ are furnished to the inputs of the unit 203 by an auxiliary speed measuring system (Doppler radar for example). In the absence of such a system, they can be obtained from the co-ordinates of the aircraft relative to the ground by derivation and filtering ; in this case, a circuit 508 is placed between the speed inputs of the unit 203 and the outputs $X_o$, $Y_o$, $Z_o$ of the unit 201. It comprises essentially three differentiators 701, 702, 703 followed by three filters 704, 705, 706 ; the co-ordinates obtained at the output of the filters are connected to an assembly of circuits 804, 805 and 806 respectively identical to the circuits 504, 505 and 506 ; the same circuits could possibly be employed with a switch.

The landing will be effected by bringing the points $B_o$ and B to $T_1$. The various output parameters of unit 203 are connected to the plates of the cathode ray devices employed for the direct or projected representation of the runway.

The parameters are represented in a discontinuous and recurrent manner with a sufficiently high repetition frequency to that the observer sees them permanently. For this purpose, a switch 510, controlled cyclically by a clock 511, connects the outputs of the unit in succession to the deflection plates of the tube CRT. A memory (not shown) may be placed between the switch 510 ... and the cathode ray tube, the read-out frequency being not necessarily the same as the writing frequency. These arrangements are known and will not be described in more detail here, since the object of the invention does not concern the production in the unit 203 of the representation of the runway , which is known in the art, but the utilization, for this representation, of the precise and complete data produced by the units 201 and 202.

Figure 19:
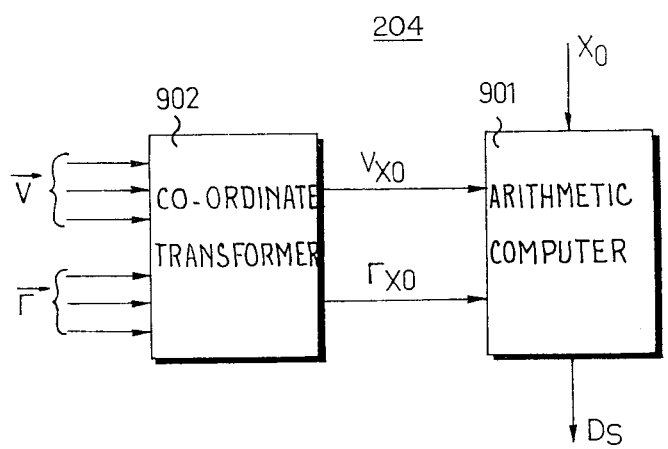

The predicted stopping distance is determined while the aircraft is running along the ground in the unit 204 by the relation $$D_s = X_o - V^2_{Xo}/2\ \Gamma_{x_o}$$

in which $X_o$, $V_{Xo}$, $\Gamma_{x_o}$, are respectively the co-ordinates of the aircraft, of its speed and of its acceleration in the direction parallel to $B_oX_o$. An accelerometer or an inertia unit generally furnishes the co-ordinate $\Gamma X_o$. The coordinate $V_{Xo}$ can be obtained either by integration of $\Gamma_{x_o}$ or by derivation from $X_o$, or by means of an auxiliary Doppler radar. Generally, the co-ordinates of the speed and acceleration are not available with respect to the axes $B_oX_oB_oY_o$. Thus the unit 204 shown in FIG. 19 comprises, in addition to an arithmetic computer 901 (multiplier, divider, and subtractor), a coordinate-transformer 902 which calculates from any co-ordinates of the speed and acceleration the co-ordinates $V_{Xo}$ and $\Gamma_{x_o}$.

Except during the landing phase of the flight, the data furnished by the system just described is also utilized in the unit 205 to preclude collision risk.

An obstacle M is dangerous if it is on or above the predicted path of the aircraft, as indicated in FIG. 20 in which AFa represents the axis of the beam of the elevation antenna, and $\Delta S$ the pointing error in elevation of a target M located at the distance D. The unit 205 calculates the expression $E_o = D \sin(\eta - \Delta S) - H_o$, in which $H_o$ is a predetermined safety altitude; the output of the unit 205 is connected to the P.P.I. indicator of the system so that only echoes in respect of which $E_o < 0$ are displayed. It is recalled that the ILM radar described with reference to FIGS. 12a and 12b have both "meteo" and landing aid functions and that, when operating for the meteo, the sum reception channel is connected to a conventional meteo receiver 15 having a P.P.I. indicator.

Figure 21:
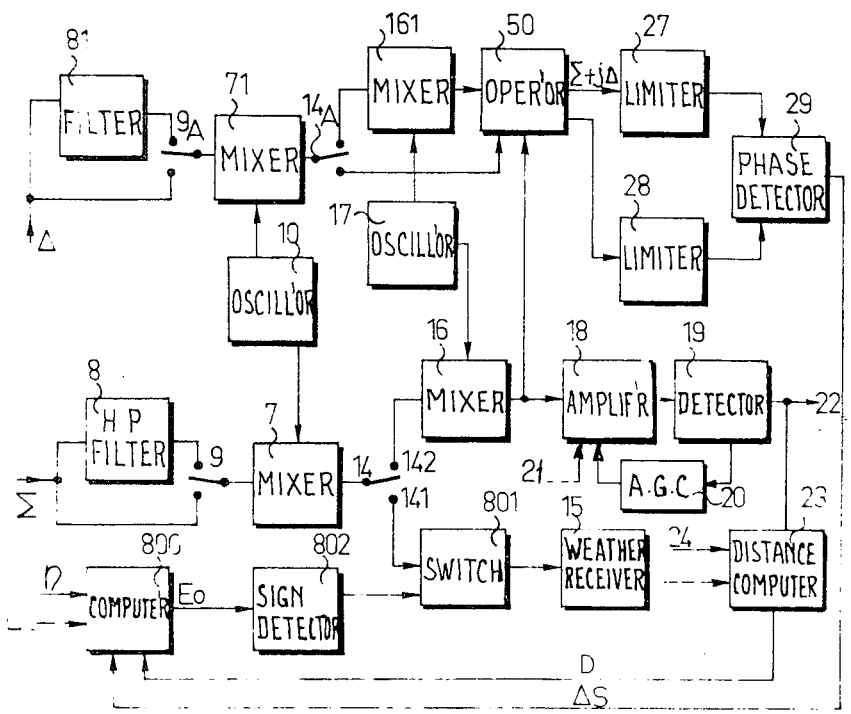

In order to ensure the anti-collision function, as indicated in FIG. 21, there is associated with the difference or Δ channel of the circuit disclosed in FIG. 12a a switch $9_A$ and a switch $14_A$ whose types and functions are similar to those of the elements 9 and 14 of the sum channel Σ; this enables having the pointing error signal ΔS at the output of the phase detector 29, also when the transmitter operates for detecting the meterological disturbances.

The distance computer 23 automatically furnishes the distance D; the computer ... 800 determines the signal $E_o$; the calculations carried out by the unit 800 are conventional and can be effected in various known manners; for example: a subtractor (not shown) furnishes $(\eta - \Delta S)$; this difference is applied to the first input of a multiplier (not shown) whose second input receives a voltage proportional to D: the voltage $H_o$ is subtracted from the output voltage of the multiplier. A switch 801 is placed between the output 141. of the switch 14 and the meteo receiver 15. The switch is actuated by the output signal of the sign detector 802 connected to the output of the unit 800 so as to connect the receiver 15 to the channel only when $E_o$ is negative.

For the sake of clarity of the figure, there have been shown in FIG. 21, among the elements of FIG. 12a, only those necessary for the description of the anti-collision device, the references employed for these elements being the same as those used in FIG. 12a. In particular, there have not been shown the various switches actuated by the general synchronizing device of the radar system which ensures the correct connection of the "g" input with the devices 401, 402, 403 in succession.

Also are not shown the details of the various eomputers which are employed in the circuit for effecting successions of simple algebraic or trigonometric operations and are in any case constructed in a manner known in the art.

The invention is of course not limited to the embodiment shown and described.

We claim:

1. An Independent Landing Monitoring (ILM) pulse radar system for use in cooperation with three reflectors $B_1$, B2 and $B_3$ (FIGS. 10, 14) and with auxiliary on board - systems supplying flight parameters, said ILM system supplying bearing and elevation information (γ, δ FIGS.10 and 11) relative to the position of the aircraft on which it is mounted with respect to the runway on which the aircraft has to land, similar to those supplied by conventional I.L.S. Systems, said radar system further comprising :

compensation circuit means (310 ,FIG. 12b)for supplying bearing values compensated for the dynamic errors in the computation of said bearing information said circuit means comprising :

first correcting means (305, 306) for compensating for the longitudinal displacement of the aircraft , said first means having inputs for the reflector parameters ($I_B$) and an output , and second correcting means (300 and 303) for compensating for the aircraft yaw movement , said second means having an input for the course of the aircraft (C), an input for the antenna bearing indication (gi),an input coupled to said first correcting means output, and an output supplying said compensated value.

2. An ILM System according to claim 1, wherein said second correcting means comprise a course variation computer (303) having an input for said course (C) and an output (ΔC) , a first algebraic adder (301, FIG.13) having a first addition input for said antenna bearing indication input, a second addition input ,coupled to said course variation computer output , a subtraction input, and an output, averaging means (302) having an input coupled to said adder output , and an output, a second adder (307) having two inputs respectively coupled to said integrating means output and to said first correcting means output, and an output, an integrator means (304) having an input coupled to said second adder output, and an output coupled to said subtraction input, said integrator output supplying the compensated bearing value.

3. An ILM System according to claim 1, wherein said first correcting means comprise a computing means (305, FIG. 13) having an input . . . for said reflector parameters and an output, and differentiating means (306) having an input coupled to said last mentioned output.

4. An ILM System according to claim 1, comprising distance parameter outputs ($r_o, r_1, r_2, r_3$ FIG. 12a) , bearing indication outputs ($G_o, G_3$), elevation indication outputs (β) , said ILM system further comprising further circuit means (201, FIG. 12 b) having inputs for said distance parameters, for said bearing and elevation indication, and for said reflector ($I_B$) parameters, said further circuit means (201) . . . supplying the distance of the aircraft to the far end of the runway ($r_{3-e}$) , the coordinates of said aircraft ( $X_{of}, Y_{of}, Z_{of}$) with respect to a trihedral fixed to the runway of the decrabing angle (Δψ), and the ILS angular deviation ($\gamma_{cf}$ and $\delta_f$ ) .

5. An ILM system according to claim 4, having an input for the aircraft acceleration parallel to the runway axis ( $\Gamma_{xo}$ FIG. 12b ) , said system further comprising distance computing means (204) having an input for said aircraft abcissa in said trihedral ($X_{of}$) , an input for said acceleration and an output supplying the predicted stopping distance of the aircraft.

6. An ILM system according to claim 1 having distance (r) antenna axis elevation (η) and elevation error signal (ΔS) outputs, said system further comprising an anti-collision circuit (205 FIG. 12b) having respective inputs coupled to said last mentioned outputs.

7. An ILM . . . system according to claim 1 having an input for the aircraft attitudes (IAT) , an input for the runway parameters (IRW) associated with a runway display means having display inputs said ILM system further comprising further circuit means (203) FIG. 12 b) for supplying said runway display means, said last mentioned further circuit means having respective inputs for said aircraft attitudes, for said runway parameters and for said bearing values supplied by said compensation circuit means, and respective outputs coupled respectively to said runway display means inputs.

8. An ILM System according to claim 1 transmitting pulses of a first given duration at a first given repetition frequency, comprising a monopulse antenna, a difference reception channel (Δ) and a sun reception channel, said sun channel comprising frequency changing means (7 FIG.12a) having an output, said ILM system further comprising means for weather radar operation, said last mentioned means comprising a weather receiver (15 FIG. 12 b and FIG.21), means for synchroneously (i) transmitting pulses of a second given duration longer than said first one and at a second repetition frequency smaller than said first one, and means for (ii) coupling said changing means output to said weather receiver.

* * * * *